United States Patent [19]

Ishida et al.

[11] 4,327,978
[45] May 4, 1982

[54] CAMERA DIAPHRAGM CONTROL DEVICE FOR FLASH PHOTOGRAPHY

[75] Inventors: Tokuji Ishida, Daito; Toshio Kobori, Sakai, both of Japan

[73] Assignee: Minolta Camera Kabushiki Kaisha, Osaka, Japan

[21] Appl. No.: 207,026

[22] Filed: Nov. 14, 1980

[30] Foreign Application Priority Data

Nov. 24, 1979 [JP] Japan .................... 54-152223

[51] Int. Cl.³ ............................................ G03B 7/085
[52] U.S. Cl. ........................................ 354/41; 354/46; 354/60 F
[58] Field of Search ................ 354/41, 42, 43, 46, 354/60 R, 60 F, 286

[56] References Cited

U.S. PATENT DOCUMENTS 4,213,682 7/1980 Yamada ........................... 354/43 X Primary Examiner—Michael L. Gellner
Attorney, Agent, or Firm—Watson, Cole, Grindle & Watson

[57] ABSTRACT

A camera diaphragm control device which arrests a diaphragm when a TTL light measurement output represents a given relationship with respect to a reference signal during stop down operation of the diaphragm can automatically set the diaphragm to a specific aperture for flash photography by the aid of a preliminary flash light produced prior to the production of a primary flash light with its intensity maintained substantially constant for a duration covering the period of time from the automatic setting of the diaphragm to the setting of the specific aperture. At the initial stage of the production of the preliminary flash light prior to the stop down of the diaphragm, an operational circuit means correlates or associates the TTL light measurement output with a signal representative of a set film sensitivity and a signal representative of the diaphragm step-difference between the maximum and specific apertures to thereby generate an output representative of a proper exposure time for the specific aperture as the reference signal. Furthermore, circuits are provided for automatically setting the diaphragm to a larger or smaller aperture when the object of interest is located outside the permissible distance range for flash photography with the specific aperture and with the primary flash light.

16 Claims, 6 Drawing Figures

CAMERA DIAPHRAGM CONTROL DEVICE FOR FLASH PHOTOGRAPHY

BACKGROUND OF THE INVENTION

1. Field of the Invention

The present invention relates to a camera diaphragm control device which measures light from an object of interest through an objective lens and a diaphragm aperture in process of being stopped down, thereby arresting the diaphragm to determine a diaphragm aperture when the output of the light measurement represents a given relationship with a reference signal, and more particularly it pertains to such a type of camera diaphragm control device which simplifies flash photography using an automatic flash light control in an electronic flash device (hereinafter called merely "strobo").

2. Description of the Prior Art

For flash photography using a strobo, it is convenient if a diaphragm aperture is automatically set to a specific aperture for flash photography such as F5.6, which can most probably provide a satisfactory photograph for the characteristics of an objective lens.

However, conventional diaphragm control devices of such a type arrest a diaphragm at a maximum aperture (fully open aperture) in a low brightness condition necessitating a flash illumination and therefore cannot automatically set the diaphragm to such a specific aperture for flash photography.

In co-pending patent application Ser. No. 56,938 filed on July 12, 1979 and assigned to the same Assignee, there has been proposed a camera flash photography system which enables a diaphragm to be stopped down even in a low brightness condition by the aid of a preliminary flash light produced by a strobo prior to the production of a primary flash light, with its intensity maintained substantially constant for a duration covering the period of time until automatic setting of the diaphragm is completed. With this system, the diaphragm is arrested when the output of the light measurement effected through the diaphragm aperture being reduced indicates a given relationship relative to a reference potential during the production of the preliminary flash light. This system, although entirely satisfactory for its intended purpose, incurs one drawback in that the automatically set diaphragm aperture varies depending on the object distance such that a long object distance may cause the diaphragm to be automatically set at the maximum aperture because the reference potential is fixed by a guide number setting of the strobo. The automatic setting of the diaphragm to the maximum aperture due to a long object distance reduces the depth of the field and frequently results in unsatisfactory photography. Further, as most objective lenses have aberrations poorly corrected for the maximum aperture, the automatic setting of the diaphragm to the maximum aperture may degrade the photographic image and this may also result in unsatisfactory photography.

SUMMARY OF THE INVENTION

Accordingly, it is a general object of the present invention to provide an improved camera diaphragm control device which is capable of automatic diaphragm setting to a specific aperture for flash photography by the aid of a preliminary flash light.

Another object of the present invention is to provide an improved camera diaphragm control device which is normally capable of the above automatic diaphragm setting to the specific aperture and which is also capable of automatic diaphragm setting to a larger aperture when an object of interest is farther than the maximum permissible distance for the flash photography with a primary flash light and with the specific aperture.

Still another object of the present invention is to provide an improved camera diaphragm control device which is normally capable of the above automatic diaphragm setting to the specific aperture and which is also capable of automatic diaphragm setting to a smaller aperture when an object of interest is nearer than the minimum permissible distance for the flash photography with a primary flash light and with the specific aperture.

According to a camera diaphragm control device of the present invention, an automatic electronic flash device, i.e. strobo, starts to produce a preliminary flash light of a substantially constant intensity a little time in advance of the actuation of a diaphragm stop down initiating means. Light measuring means measures light from an object of interest under illumination by the preliminary flash light through the diaphragm aperture to generate a first signal indicative of the light measurement result. A first reference signal circuit generates a first reference signal which has a given relationship with respect to the first signal to be generated by the light measurement through a specific diaphragm aperture with the object under illumination by the preliminary flash light. When the given relationship has been achieved between the first signal and the first reference signal due to the diaphragm being stopped-down to the specific aperture, a first actuating signal is generated for actuating a diaphragm arresting means.

In preferred embodiments of the invention, the first reference signal circuit includes means for correlating or associating the first signal generated, with the diaphragm maintained at the maximum aperture for the illuminated object, with a second signal representative of the diaphragm step-difference between the aperture values of the maximum and specific apertures to generate a third signal as the first reference signal. These embodiments also include means for storing the third signal in association with the initiation of the diaphragm stop down operation.

With the above basic construction of the present invention, the diaphragm is automatically set to the specific aperture at all times using the preliminary flash light. This simplifies flash photography but, on the other hand, restricts the object distance range for which flash photography is possible with a proper exposure. Assume that an objective lens whose maximum aperture is F1.4 and a strobo whose maximum guide number is 22 are used, and that F5.6 is selected as the specific aperture. Then, the above basic construction can provide a proper exposure for an object located only at a distance up to about 4 m while the objective lens and the strobo by nature can provide a proper exposure for an object located at a distance up to about 16 m with the maximum aperture.

To obviate this drawback, the present invention employs a second reference signal circuit for generating a second reference signal which is equal to the first reference signal to be generated by the first reference signal circuit when a standard object, located at the maximum permissible distance for the flash photography with the primary flash light and with the specific aperture, is illuminated by the preliminary flash light. The invention also includes means for generating a second actuating signal when a given relationship has been achieved between the first signal and the second reference signal during the emission of the preliminary flash light. Finally, a logic circuit is provided for actuating the diaphragm arresting means in response to one of the first and second actuating signals which is generated earlier than the other.

On the other hand, the above basic construction of the present invention suffers from an improper exposure when an object of interest is located at a distance nearer than the minimum permissible distance for the flash photography with the primary flash light and with the specific aperture. That is, when a strobo whose minimum guide number is 4 is used, the minimum permissible distance for F5.6 is about 0.7 m and an object located nearer than this distance is photographed with an overexposure due to excessive illumination by the primary flash light.

To obviate this drawback, the present invention employs a third reference signal circuit for generating a third reference signal which is equal to the first reference signal to be generated by the first reference signal circuit when a standard object, located at the minimum permissible distance for the flash photography with the primary flash light and with the specific aperture, is illuminated by the preliminary flash light. The present invention also incorporates means for generating a third actuating signal when a given relationship has been achieved between the first signal and the third reference signal during the emission of the preliminary flash light. A logic circuit actuates the diaphragm arresting means when both of the first and third signals are generated.

The above and other objects and features of the present invention will become more apparent from the following description of the preferred embodiments taken in connection with the accompanying drawings.

DETAILED DESCRIPTION OF THE PREFERRED EMBODIMENTS

Figure 1:
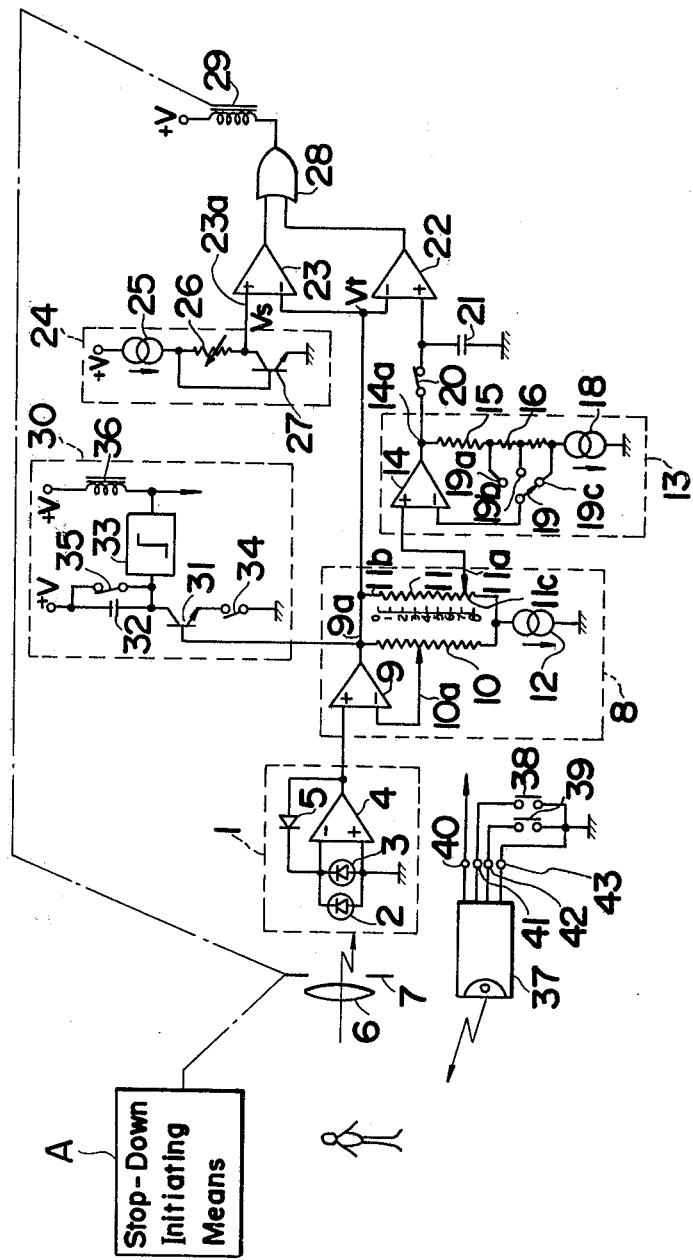
FIG. 1 is a circuit diagram of a first embodiment of the present invention.
Figure 2:
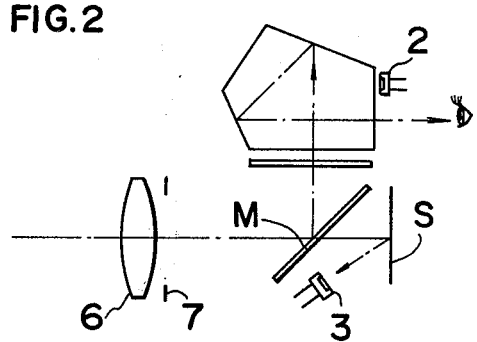
FIG. 2 is a layout diagram of photodiodes.

With reference to FIG. 1, light measuring circuit 1 generates a voltage signal proportional to the logarithm of the intensity of light from an object of interest which is incident upon photodiodes 2 and 3 after passing through objective lens 6 and diaphragm 7. Photodiode 2 is disposed to receive the scene light having passed through objective lens 6 and diaphragm 7 before exposure starts, and the other photodiode 3 is positioned to receive the light reflected from the surface of a film during exposure. FIG. 2 diagrammatically shows a layout of photodiodes 2 and 3. Diaphragm 7 is stopped down from a maximum aperture (fully open aperture) towards a minimum aperture in response to operation of diaphragm stop down initiating means A which is operated at an initial stage of a shutter release operation. When electromagnet 29 is deactivated, an arresting member (not shown) responsive thereto arrests the diaphragm during the process of stop down operation, whereby an aperture size is determined. First exposure information operational circuit 8 consists of operational circuit 9, potentiometers 10 and 11 and constant-current regulated power source 12. Slider 10a of potentiometer 10 engages a film sensitivity dial (not shown) and is set to a position corresponding to a set film sensitivity. Slider 11a of potentiometer 11 engages a diaphragm presetting ring (not shown) provided on a lens barrel of an exchangeable lens and is slid from terminal 11b towards terminal 11c by a distance corresponding to a diaphragm step-difference between the maximum aperture and preset aperture values. With the diaphragm fully opened, a voltage signal representative of a proper exposure time to be determined by scene brightness, film sensitivity and the aperture value of the maximum aperture is generated from terminal 9a forming a first output terminal of first information operational circuit 8. Furthermore, a proper exposure time signal for the aperture value of the preset aperture is generated from terminal 11a forming a second output terminal.

Second exposure information operational circuit 13 includes a level shift circuit. When a minimum aperture is preset by the diaphragm presetting means, a proper exposure signal for a specific aperture, e.g., F5.6, is generated from stationary contact 19a. It should be understood that three types of the minimum apertures F16, F22 and F32, are available for exchangeable lenses for use in a camera to which the circuitry of FIG. 1 is applied. A movable switch contact 19 comes in contact with stationary contacts 19a, 19b and 19c, respectively, relative to minimum apertures F16, F22 and F32. Resistor 15 generates a voltage corresponding to a three step-difference of aperture values, and resistors 16 and 17 generate a voltage corresponding to a one step-difference of aperture values, respectively. An example is given here for the use of an exchangeable lens having a minimum aperture of F22. When the diaphragm is preset to F22, switch contact 19 is changed to stationary contact 19b and a proper exposure time signal voltage for F22 appears at stationary contact 19b. A voltage representing four steps is developed between terminal 14a and stationary contact 19b, causing terminal 14a to generate a proper exposure time signal voltage for F5.6. It is to be noted that a signal member provided on the diaphragm presetting ring of an exchangeable lens engages and sets a lever on a camera body to a position corresponding to the value of the minimum aperture when the diaphragm presetting ring is operated to a position to preset the minimum aperture. A lens system consisting of a series of lenses having such a signal member is disclosed, for example, in U.S. Pat. No. 4,118,726. When combined with this system, potentiometer 11 and switch 19 are substantially used to calculate information commensurate with the aperture value of the maximum aperture of a lens in use. Thus, a signal voltage representative of a proper exposure time for specific aperture F5.6 is generated from output terminal 14a with the diaphragm maintained at the maximum aperture, regardless of the aperture value of the maximum aperture of an exchangeable lens in use. It should be noted that the switch 19 is not required in second exposure information operational circuit 13 for a lens system consisting of one type of lenses whose minimum apertures have the same aperture value. The output of operational circuit 13 is applied through memory switch 20 to memory capacitor 21. Memory switch 20 is opened at the initial stage of the emission of a preliminary flash light from strobo 37 prior to the stop down of diaphragm 7, as described later, and remains open at least until an aperture size is determined through diaphragm control. Memory switch 20 and capacitor 21 together constitute a signal storing circuit means. Operational amplifiers 22 and 23 are used as voltage comparator circuits, their negative input terminals being connected to output terminal 9a of exposure information operational circuit 8. Reference signal circuit 24 includes constant-current regulated power source 25, resistor 26 and transistor 27. At output terminal 23a appears a voltage equal to a balance of the voltage between the base and emitter of transistor 27, from which a voltage drop across resistor 26 is deducted. This voltage is set and adjusted to be equal to an output voltage from output terminal 14a of operational circuit 13 when a standard object positioned in the maximum permissible distance of the strobo at a specific aperture (F5.6) and a specific film sensitivity (e.g., ASA100) (about 4 m where guide number GN equals 22) is illuminated by the preliminary flash light produced by the strobo. The output terminals of voltage comparator circuits 22 and 23 are connected to the two input terminals of OR gate 28, respectively, and the output terminal of OR gate 28 is connected to one end of the winding of electromagnet 29. When the voltage level at the negative input terminals of voltage comparator circuits 22 and 23 goes below that at either of the positive input terminals, the output of OR gate 28 becomes "High", whereby electromagnet 29 is deactivated to arrest diaphragm 7 in process of the stop-down operation. Exposure time control circuit 30 starts the integration of a current commensurate with the voltage level at terminal 9a in synchronization with the shutter opening and generates a signal voltage which is inverted from "Low" to "High" when the integrated value of capacitor 32 reaches a preset value. Exposure time control circuit 30 consists of transistor 31 for logarithmic expansion, current integrating capacitor 32, Schmitt trigger circuit 33, count switch 34 and discharge switch 35. The base of transistor 31 forming the input terminal of exposure time control circuit 30 is connected to output terminal 9a of exposure information operational circuit 8, the output of exposure time control circuit 30 is connected to one end of the winding of electromagnet 36, for causing shutter closure, and is also connected to flash stop signal input terminal 40 of strobo 37.

Figure 3:
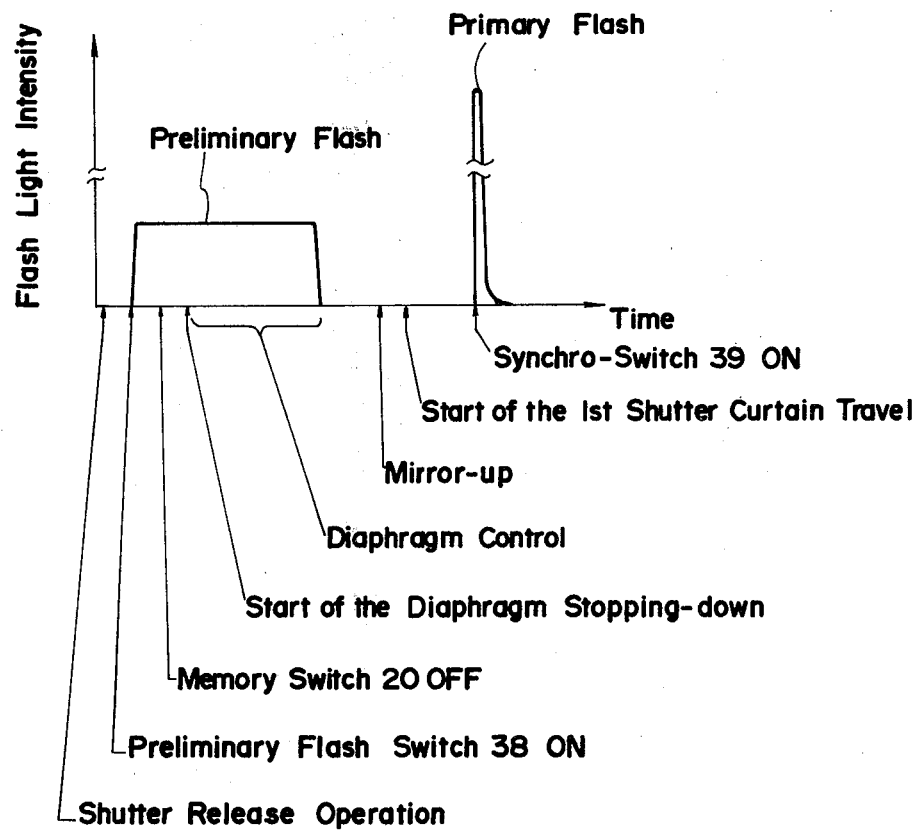
FIG. 3 illustrates the luminous conditions of preliminary flash light and primary flash light.

Strobo 37 emits a preliminary flash light of a predetermined constant intensity for a specific period of time when preliminary flash switch 38 is closed at the initial stage of the shutter release operation, as shown in FIG. 3. Strobo 37 also emits a primary flash light for actual flash photography when synchronization switch 39 is closed in response to the full shutter opening.

Figure 4:
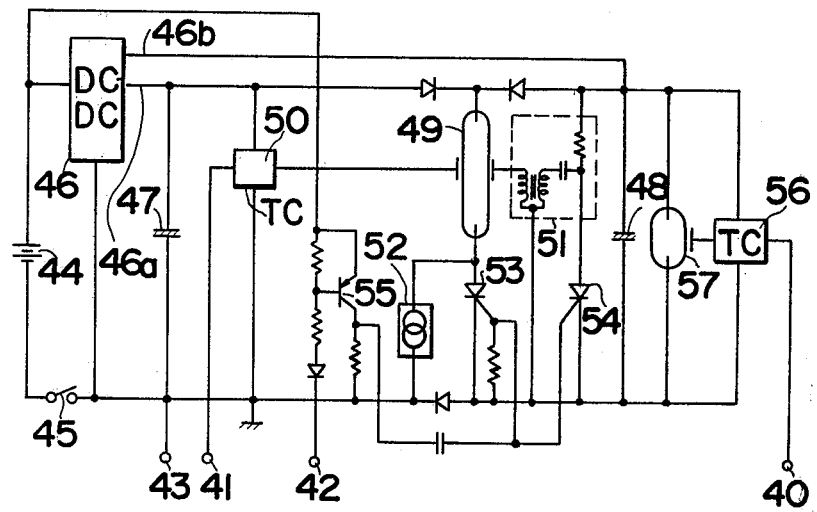
FIG. 4 is a circuit diagram of a strobo for use in the embodiments of the present invention.

FIG. 4 is a circuit diagram of the strobo shown in FIG. 1. Referring to FIG. 4, flash tube 49 is used for production of both preliminary and primary flash light. The energy for production of the preliminary flash light is stored in first primary capacitor 47 and that for production of the primary flash light is stored in second primary capacitor 48.

DC-DC converter 46 converts the voltage of power cell 44 into DC voltages of 200 V and 350 V at output terminals 46a and 46b, respectively. Trigger circuit 50 (identical to a circuit shown by block 51) triggers flash tube 49 when switch 38 inside the camera body (refer to FIG. 1) is closed. First primary capacitor 47 is discharged by trigger circuit 50 through flash tube 49 and constant-current circuit 52, causing the flash tube to emit a preliminary flash light of a predetermined constant intensity for a specific period of time. In this case, thyristor 53 remains OFF, thereby preventing second primary capacitor 48 from being discharged.

Next, when synchronization switch 39 of the camera (refer to FIG. 1) is closed, terminal 42 is grounded, causing transistor 55 to be turned ON. This causes thyristors 53 and 54 to be conductive, whereby second primary capacitor 48 starts to be discharged. Thus, a primary flash light is emitted from tube 49. When, in the primary flash process, a flash stop signal is applied from the camera to terminal 40, trigger circuit 56 is actuated to turn by-pass tube 57 ON, causing second primary capacitor 48 to be discharged at a stretch through by-pass tube 57, whereby the primary flashing of flash tube 49 is stopped. It should be noted that the primary flashing of tube 49 may be stopped by turning OFF thyristor 53 instead of using by-pass tube 57, as is well known.

Description will now be given of the operation of the circuitry shown in FIG. 1.

Assume that strobo 37 is in the complete condition for flash preparations and the flash circuitry in the camera is in the charged-up condition. With the camera aimed at an object of interest and a shutter botton (not shown) depressed, preliminary flash switch 38 is first closed, causing strobo 37 to start preliminary flashing. Memory switch 20 is then opened, and a proper exposure time signal voltage at specific aperture F5.6 for an object illuminated by the preliminary flash light is stored by memory capacitor 21. Next, diaphragm stop-down initiating means A operates to allow stop-down operation of diaphragm 7, causing voltage Vt at the negative input terminals of voltage comparator circuits 22 and 23 to decline as diaphragm 7 is stopped-down. During this period, the preliminary flash light continues to be produced at a predetermined constant intensity. When reference voltage Vs generated from terminal 23a is at a higher level than the voltage stored in memory capacitor 21, voltage Vt matches reference voltage Vs in the process of the diaphragm stop-down operation. At the instant both voltages Vt and Vs match each other, the output of voltage comparator circuit 23 is inverted from "Low" to "High", in response to which electromagnet 29 is deactivated, causing an aperture size to be determined. In this case, the aperture size thus determined represents an aperture value between the maximum aperture and F5.6. In contrast thereto, when the voltage stored in memory capacitor 21 is at a higher level than reference voltage Vs, output voltage Vt of exposure information operational circuit 8 matches the stored voltage in the process of the diaphragm stop down operation, causing the output of voltage comparator circuit 22 to be inverted from "Low" to "High", whereby diaphragm 7 is set to F5.6. With such diaphragm control, diaphragm 7 is not stopped-down beyond a specific aperture F5.6, and therefore, the period of time during which the preliminary flashing is to continue is that period of time required from the start of preliminary flashing until the diaphragm stops-down to the specific aperture F5.6. Since, however, the latter period differs with the exchangeable lens to be used due to different maximum apertures, the former period is determined to be longer than the latter period to provide the necessary spare time. For the light measuring and control operations so far described, the output of photodiode 2 is used.

Subsequent to the determination of the diaphragm aperture, a reflecting mirror M (FIG. 2) is sprung up, thereby causing the shutter to be opened. Synchronization switch 39 is closed when the shutter is fully opened, whereby a primary flash light is emitted from strobo 37. The light from an object reflected at exposed film surface S (FIG. 2) after passing through the determined aperture is received by photodiode 3, and integrating capacitor 32 of exposure time control circuit 30 is charged by a current commensurate with the intensity of the reflected light received by photodiode 3. When the quantity of light reaches a level providing a proper exposure, the output of Schmitt circuit 33 is inverted from "Low" to "High" and in response thereto, primary flashing of strobo 37 is stopped, while electromagnet 36 is deactivated causing the shutter to be closed for exposure termination.

Since the light from an object having passed through the determined aperture is monitored to determine the quantity of the primary flash light, flash photography with a proper exposure is effected so long as the object is within the permissible distance range of the strobo. With the present embodiment, however, the reference signal of reference signal circuit 24 is effective only for a specific film sensitivity (e.g. ASA100). If the level of reference signal voltage Vs is changed by adjustment of the resistance of variable resistor 26 associated with film sensitivity setting, reference signal voltage circuit 24 becomes effective even for a variety of film sensitivities. Additionally, the disclosure herein only describes circuits related to diaphragm control for flash photography and flash light quantity control; however, it is apparent to one of ordinary skill in the art that the function of an ordinary photographic mode for a high or normal brightness condition may be added to those functions. Furthermore, various modifications may be adopted to include automatic changeover of ordinary photographic modes, e.g., diaphragm priority automatic exposure time control mode and flash photographic mode, in accordance with the charging conditions of primary capacitor 48 inside the strobo.

Figure 5:
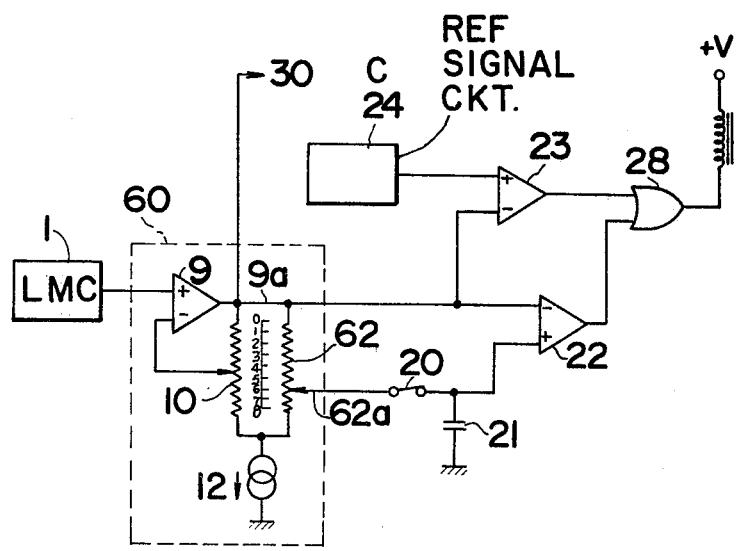
FIG. 5 is a circuit diagram of a second embodiment of the present invention.

FIG. 5 shows a second embodiment of the present invention. With the first embodiment, a proper shutter speed signal for specific aperture F5.6 for flash photography is generated through first and second operational circuits 8 and 13. In contrast thereto with the second embodiment, the same signal is generated only through operational circuit 60.

Operational circuit 60 consists of potentiometers 10 and 62, operational amplifier 9 and constant-current regulated power source 12. Potentiometer 10 is set to a resistance value corresponding to a set film sensitivity in a similar manner to the case of FIG. 1. On the other hand, potentiometer 62 includes slider 62a engageable with a signal member (not shown) provided on an exchangeable lens, and its resistance value is set by the signal member in accordance with the diaphragm step-difference between the aperture values of the maximum aperture of the exchangeable lens and specific aperture F5.6. Namely, if the maximum aperture of an exchangeable lens is F1.4, the diaphragm step-difference up to F5.6 is four and the resistance value is set in accordance with four steps. If the maximum aperture is F2, the diaphragm step-difference up to F5.6 is three and the resistance value is set in accordance with three steps. Therefore, the output of operational circuit 60 always represents a proper shutter speed signal for specific aperture F5.6 when the diaphragm is fully opened.

It should be understood that the first and second operational circuits 8 and 13 in the first embodiment of FIG. 1 are equivalent to operational circuit 60 in the second embodiment of FIG. 5 for correlating or associating the output signal of light measuring circuit 1 with a signal representative of a specific diaphragm step-difference commensurate with the aperture value of the maximum aperture of an exchangeable lens. That is, first and second operational circuits 8 and 13 introduce the information of specific aperture Fs in accordance with the equation:

$$F_s = F_{MAX} - F_{MIN} + P_1 \qquad (1)$$

wherein $F_{MAX}$ and $F_{MIN}$ represent the aperture values of the maximum and minimum apertures, respectively, and $P_1$ represents a diaphragm step-difference between the aperture values of the minimum and specific apertures. Operational circuit 60 introduces the information of specific aperture Fs in accordance with the equation:

$$F_s = F_{MAX} - P_2 \qquad (2)$$

wherein $P_2$ represents a diaphragm step-difference between the aperture values of the maximum and specific apertures. It should be understood that there is the following relationship between $P_1$, $P_2$, $F_{MAX}$ and $F_{MIN}$:

$$P_1 + P_2 = F_{MIN}$$

Adding step-difference P1 to the step-difference $F_{MAX} - F_{MIN}$ as in equation (1) is the same as subtracting step-difference P2 from the aperture value $F_{MAX}$ of the maximum aperture as in equation (2).

Figure 6:
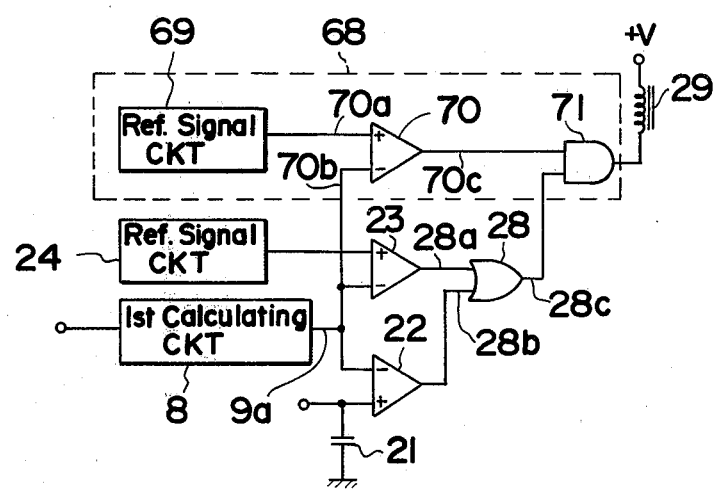
FIG. 6 is a circuit diagram of a third embodiment of the present invention.

FIG. 6 shows a circuit diagram of a third embodiment of the present invention with block 68 added to the circuitry of FIG. 1. The circuit of this embodiment solves a problem to be described below. With an automatic flash light control strobo as shown in FIG. 4, when emission of flash light once starts, light energy, the amount of which is peculiar to the strobo, is unnecessarily emitted even if a flash stop signal is applied to a flash stop circuit soon after the start of the flash light emission. In other words, a minimum permissible distance, i.e., a flash light control limit, exists in a near distance range. The minimum permissible distance may be shortened by stopping down a diaphragm of an objective lens to a smaller value.

With the circuitry in FIG. 1, the diaphragm is adjusted to a specific aperture, e.g., F5.6, for an object in a near distance range, but such diaphragm adjustment may cause an overexposure to occur for the object. The circuitry in FIG. 6 is constructed such that the diaphragm is stopped-down to an aperture beyond the specific aperture when an overexposure occurs with the specific aperture.

With reference to FIG. 6, reference signal circuit 69 is identical in construction to reference signal circuit 24, except that the voltage generated by circuit 69 differs from that generated by circuit 24. The voltage generated by reference signal circuit 69 is set to a value to be described below. Assuming that the minimum flash light quantity peculiar to strobo 37 is estimated as a guide number of GN=4, a proper object distance for specific aperture F5.6 is approximately 0.7 m. If it is assumed that a voltage were to appear at output terminal 14a of second operational circuit 13 when a preliminary flash light produced from strobo 37 for a standard object at a distance of 0.7 m, such an assumed voltage is generated by reference signal circuit 69.

The voltage thus generated by reference signal circuit 69 is applied to positive input terminal 70a of voltage comparator circuit 70, and the output from terminal 9a of first operational circuit 8 is applied to negative input terminal 70b. Output 70c of voltage comparator circuit 70 and output 28c of OR gate 28 are connected to the input terminals of AND gate 71, respectively. The output terminal of AND gate 71 is connected to one end of the winding of electromagnet 29.

Description will now be given of the circuit operation of FIG. 6.

Assume that an object of interest is at a distance where a proper exposure is provided at specific aperture F5.6 by the primary flashing of the strobo. In this case, the diaphragm is stopped-down as described earlier and when stopped down to F5.6, the output of voltage comparator circuit 22 becomes "High". If the signal level at negative input terminal 70b of voltage comparator circuit 70 is lower than that at positive input terminal 70a before the diaphragm is stopped-down to F5.6, voltage comparator circuit 70 generates "High" voltage, before the diaphragm is stopped-down to F5.6. Therefore, the two input terminals of AND gate 71 are "High" when the diaphragm is stopped-down to F5.6, whereby electromagnet 29 is deactivated to arrest the diaphragm in the process of the stop operation.

In contrast thereto, if the voltage level at negative input terminal 70b of voltage comparator circuit 70 is higher than that at positive input terminal 70a when the diaphragm is stopped down to F5.6, the output of AND gate 71 remains "Low", causing electromagnet 29 to remain activated. Therefore, the diaphragm is stopped-down beyond F5.6. When the diaphragm is stopped-down such that the level at negative input terminal 70b matches that at positive input terminal 70a, the output of voltage comparator circuit 70 is inverted to a "High" level. In response thereto, electromagnet 29 is deactivated, whereby the diaphragm aperture is determined. For an exposure, the light from an object having passed through the aperture thus determined is monitored by photodiode 3 to control the quantity of primary flash light.

With the embodiment of FIG. 6, the period of time during which the preliminary flashing of the strobo continues should include the whole period of time required for the diaphragm to be stopped-down to the minimum aperture because the diaphragm may be automatically set to the minimum aperture for an extremely near object.

With continuing reference to FIG. 6, a reference voltage for a specific film sensitivity ASA100 is generated from reference signal circuit 69. However, the reference voltage may be changed in accordance with film sensitivity as has been previously described. Furthermore, the diaphragm is set to specific aperture F5.6 for a specific distance range. However, the diaphragm may be set to another specific aperture such as F8 by adjusting the resistance of resistor 15 in the circuitry of FIG. 1. Furthermore, a diaphragm setting dial or a similar means may be provided on the strobo and a signal corresponding to an aperture value set by the dial may be transmitted to the camera such that the resistance value of resistor 15 varies with the transmitted signal.

If photodiode 2 in FIG. 2 is disposed for "even" or average light measurement over almost the entire range of the scene to be photographed and photodiode 3 is provided for partial light measurement over a part of a specific range of the scene to be photographed (the center of the scene to be photographed) and that scene is illuminated by a strobo mounted to the camera, and if the output signal level of reference signal circuit 69 in FIG. 6 is set as described below, a proper exposure can be obtained from flash photography for the whole scene to be photographed, including a backlight or shadowed main object. Specifically, in this case, the output voltage of reference signal circuit 69 is set to a voltage equal to that applied across the base and emitter of transistor 31 (see FIG. 1) for logarithmic expansion when exposure time control circuit 30 provides a shutter speed of 1/60 second. In other words, if it is assumed that the shutter speed is 1/60 second, the brightness of a background of a shadowed main object is Bv8 and the set film sensitivity is ASA100, and the aperture which provides a proper exposure for the bright background without flashing the strobo is F11, the voltage appearing at terminal 9a of first operational circuit 8 when the diaphragm is adjusted to F11 is equal to the output voltage of reference signal circuit 69. With the diaphragm stopped-down under these settings without preliminary flashing by the strobo, the output of OR gate 28 first becomes "High" when the diaphragm is stopped-down to F5.6, and the output of voltage comparator circuit 70 also becomes "High" when the diaphragm is stopped-down to F11, whereby electromagnet 29 is deactivated, thereby arresting the diaphragm in process of the stop down operation. Namely, in the above example, the diaphragm is always set to F11 automatically. When photographic exposure is carried out at F11 and a shutter speed of 1/60 second is thus set without flashing the strobo, a proper exposure is naturally obtained for the bright background of a main object. However, underexposure occurs in the shadowed main object. Contrarily, with the strobo flashed to produce only the primary flash light, the bright background (usually at a long distance) remains unaffected by the strobo flash light and is photographed with a proper exposure. On the other hand, the shadowed main object is illuminated by the strobo flash light and the light reflected therefrom is incident upon photodiode 3. The output of Schmitt circuit 33 in FIG. 1 is inverted to "High" when exposure becomes proper for the shadowed main object, whereby the strobo flashing is stopped. Therefore, a proper exposure is obtained also for the main object. It is to be noted that the exposure time control circuit 30 of FIG. 1, in this case, starts integration in synchronization with the approximate closure timing of strobo switch 39 by means of a mechanical or electrical delay circuit to be additionally provided without synchronizing with the shutter opening. Furthermore, shutter speed control is not done by exposure time control circuit 30 of FIG. 1, but requires a shutter speed changeover circuit which detects the charging completion of the strobo and sets a shutter speed to 1/60 second, for example. This makes possible automatic setting of not only diaphragm but also shutter speed for backlight flash photography, thereby allowing a photograph with a proper exposure over the entire scene to be photographed.

While embodiments of the present invention have been described using the accompanying drawings, which illustrate preferred embodiments and the best mode of carrying out the invention, the present invention is not limited to such embodiments. For example, the circuitry of FIG. 1 may exclude reference signal circuit 24, voltage comparator circuit 23 and OR gate 28 and instead the output terminal of voltage comparator circuit 22 is directly connected to one end of the winding of electromagnet 29 so that the basic operation of automatically setting the diaphragm to specific aperture F5.6 at all times is performed. Noreover, in the circuitry of FIG. 6, reference signal circuit 24, voltage comparator circuit 23 and OR gate 28 can be similarly excluded, and instead thereof, the output terminal of voltage comparator circuit 22 is directly connected to one end of the winding of electromagnet 29 so that only the basic operation and automatic setting of the diaphragm to a smaller aperture when an object of interest is at a close range may be performed. Further, the same diaphragm control as described in connection with the circuitry of FIG. 1 may be effected if the output of light measuring circuit 1 is directly applied to one end 11b of potentiometer 11 without introduction of the information of a set film sensitivity by means of potentiometer 10.

As described so far, the diaphragm control device of the present invention is capable of automatic diaphragm setting to a specific aperture for flash photography by the aid of a preliminary flash light produced by a strobo, thereby achieving simplified flash photography.

However, the diaphragm control device of the present invention is also capable of automatic diaphragm setting to a larger aperture when an object of interest is further than the maximum permissible distance for the flash photography with a primary flash light produced by the strobo and the specific aperture so that such an object can also be photographed with a proper exposure.

Furthermore, the diaphragm control device of the present invention is capable of automatic diaphragm setting to a smaller aperture when an object of interest is nearer than the minimum permissible distance for the flash photography with a primary flash light produced by the strobo and with the specific aperture so that such an object can also be photographed with a proper exposure.

We claim:

1. A camera diaphragm control device comprising:
   an objective lens having a diaphragm capable of being stopped-down from a maximum aperture to a minimum aperture;
   operable means for initiating the stop down operation of said diaphragm;
   means for measuring light from an object of interest through the diaphragm aperture formed by said diaphragm to generate a light measurement output;
   means for introducing information of a set film sensitivity to said light measurement output to generate a first signal representative of an exposure time which is proper for the diaphragm aperture at the time of the light measurement;
   means for producing preliminary flash light at a substantially constant intensity for a relatively long duration prior to emission of primary flash light to be used in actual photographing;
   means for actuating said preliminary flash light producing means in advance of the operation of said diaphragm stop down initiating means;
   a first reference signal circuit for generating a first reference signal representative of an exposure time proper for a specific aperture;
   means for generating a first actuating signal with a given relationship achieved between said first signal and said first reference signal during the emission of said preliminary flash light; and
   means for arresting said diaphragm in response to said first actuating signal.

2. A camera diaphragm control device as claimed in claim 1, wherein said first reference signal circuit includes:
   means for correlating said first signal generated, with said diaphragm maintained at the maximum aperture, with a second signal representative of a diaphragm step-difference between the aperture values of said maximum and said specific aperture, to generate a third signal representative of an exposure time which is proper for said specific aperture; and
   means for storing said third signal in association with the initiation of the stopping-down operation of said diaphragm, said third signal stored in said storing means corresponding to said first reference signal.

3. A camera diaphragm control device as claimed in claim 2, wherein said correlating means includes:
   a first operational circuit for correlating said first signal generated, with said diaphragm maintained at the maximum aperture, with a fourth signal representative of the diaphragm step-difference between the aperture values of the maximum and minimum apertures, to generate a fifth signal representative of an exposure time proper for the minimum aperture; and
   a second operational circuit for correlating said fifth signal with a sixth signal representative of the diaphragm step-difference dependent on the aperture value of the minimum aperture to generate said third signal.

4. A camera diaphragm control device as claimed in claim 3, wherein said first operational circuit includes a potentiometer having one end terminal receiving said first signal and an output sliding terminal positioned from said one end terminal an amount corresponding to the diaphragm step-difference between the aperture values of the maximum and minimum apertures by a diaphragm presetting to the minimum aperture, said fifth signal appearing at said output sliding terminal and the voltage appearing between said one end terminal and said output sliding terminal being said second signal.

5. A camera diaphragm control device as claimed in claim 4, wherein said second operational circuit includes a level shift circuit having an output level set in accordance with the value of the minimum aperture of said object lens upon the presetting of the diaphragm to the minimum aperture, said level shift circuit being connected to said output sliding terminal such that said output level is added to said fifth signal, whereby the sum of said fifth signal and said output level is said third signal.

6. A camera diaphragm control device as claimed in claim 3, wherein said first actuating signal generating circuit includes a first comparator having a pair of input terminals connected to said set film sensitivity information introducing means and said storing means to receive said first and third signals respectively, the output of said first comparator being inverted with the given relationship achieved between said first and third signals, and the inversion of the output of said first comparator being said first actuating signal.

7. A camera diaphragm control device as claimed in claim 2, wherein said correlating means includes an operational circuit for correlating said first signal, with said diaphragm maintained at the maximum aperture, with a fourth signal representative of a diaphragm step-difference dependent on the aperture value of the maximum aperture to generate said third signal.

8. A camera diaphragm control device as claimed in claim 1, further comprising:
- a second reference signal circuit for generating a second reference signal equal to said first reference signal to be generated by said first reference signal circuit with a standard object, located at the maximum permissible distance for flash photography by said primary flash light and said specific aperture, illuminated by said preliminary flash light;
- means for generating a second actuating signal, for actuating said diaphragm arresting means with a given relationship established between said first signal and said second reference signal during emission of said preliminary flash light; and
- a logic circuit for actuating said diaphragm arresting means in response to the first generated of said first or second actuating signals.

9. A camera diaphragm control device as claimed in claim 1, further comprising:
- a second reference signal circuit for generating a second reference signal equal to said first reference signal to be generated by said first reference signal circuit with a standard object, located at the minimum permissible distance for flash photography by said primary flash light and said specific aperture, illuminated by said preliminary flash light;
- means for generating a second actuating signal for actuating said diaphragm arresting means with a given relationship established between said first signal and said second reference signal during emission of said preliminary flash light; and
- a logic circuit for actuating said diaphragm arresting means with both of said first and second actuating signals being generated.

10. A camera diaphragm control device as claimed in claim 1, further comprising:
- a second reference signal circuit for generating a second reference signal equal to said first reference signal to be generated by said first reference signal circuit with a standard object, located at the maximum permissible distance for flash photography by said primary flash light and said specific aperture, illuminated by said preliminary flash light;
- means for generating a second actuating signal for actuating said diaphragm arresting means with a given relationship established between said first signal and said second reference signal during emission of said preliminary flash light;
- a third reference signal circuit for generating a third reference signal equal to said first reference signal to be generated by said first reference signal circuit with the standard object, located at the minimum permissible distance for flash photography by said primary flash light and said specific aperture, illuminated by said preliminary flash light;
- means for generating a third actuating signal for actuating said diaphragm arresting means with a given relationship established between said first signal and said third reference signal; and
- logic circuit means for actuating said diaphragm arresting means with said third actuating signal and either said first actuating signal or said second actuating signal generated.

11. A camera diaphragm control device as claimed in claim 1, further comprising:
- a second reference signal circuit for generating a second reference signal equal to said first reference signal to be generated by said first reference signal circuit with a standard object, located at the maximum permissible distance for flash photography by said primary flash light and said specific aperture, illuminated by said preliminary flash light;
- means for generating a second actuating signal for actuating said diaphragm arresting means with a given relationship achieved between said first signal and said second reference signal during emission of said preliminary flash light; and
- a logic circuit for actuating said diaphragm arresting means in response to the first generated of said first or second actuating signals.

12. A camera diaphragm control device as claimed in claim 1, further comprising:
- a second reference signal circuit for generating a second reference signal equal to said first reference signal to be generated by said first reference signal circuit with a standard object, located at the minimum permissible distance for flash photography by said primary flash light and said specific aperture, illuminated by said preliminary flash light;
- means for generating a second actuating signal for actuating said diaphragm arresting means with a given relationship achieved between said first signal and said second reference signal during emission of said preliminary flash light; and
- a logic circuit for actuating said diaphragm arresting means with both of said first and second actuating signals generated.

13. A camera diaphragm control device for flash photography, comprising:
- an objective lens having a diaphragm capable of being stopped-down from a maximum aperture to a minimum aperture;
- means for initiating the stop down operation of said diaphragm;
- means for measuring light from an object of interest through the diaphragm aperture formed by said diaphragm to generate a first signal indicative of the light measurement;
- means for producing a preliminary flash light at a substantially constant intensity for a relatively long duration prior to the emission of primary flash light to be used in actual photographing;
- means for actuating said preliminary flash light producing means in advance of the operation of said diaphragm stop down initiating means;
- a first reference signal circuit for generating a first reference signal having a given relationship with respect to said first signal to be generated by said light measuring means through a specific aperture formed by said diaphragm;

means for generating a first actuating signal with a given relationship achieved between said first signal and said first reference signal during the emission of said preliminary flash light; and means for arresting said diaphragm in response to said first actuating signal.

14. A camera diaphragm control device as claimed in claim 13, wherein said first reference signal circuit includes:

means for associating said first signal generated by the light measurement through the maximum aperture with a second signal representative of a diaphragm step-difference between the aperture values of said maximum and specific apertures, to generate a third signal having said given relationship with respect to said first signal to be generated by the light measurement through the specific aperture; and means for storing said third signal in association with the initiation of the stopping-down operation of said diaphragm, said third signal stored in said storing means corresponding to said first reference signal.

15. A camera diaphragm control device as claimed in claim 14, wherein said third signal generating means includes:

a first operational circuit for associating said first signal generated by the light measurement through the maximum aperture with a fourth signal representative of the diaphragm step-difference between the aperture values of the maximum and minimum apertures of said objective lens, to generate a fifth signal having a given relationship with respect to said first signal to be generated by the light measurement through the minimum aperture; and a second operational circuit for associating said fifth signal with a sixth signal representative of the diaphragm step-difference dependent on the aperture value of the minimum aperture to generate said third signal.

16. A camera diaphragm control device as claimed in claim 14, wherein said first reference signal circuit includes an operational circuit for associating said first signal generated by the light measurement through the maximum aperture with a fourth signal representative of a diaphragm step-difference dependent on the aperture value of the maximum aperture to generate said third signal.

* * * * *